Aug. 12, 1930.  H. S. POWELL  1,772,730
CUSHION JOINT FOR THE SPRINGS OF AUTOMOBILES
Filed Aug. 3, 1927   2 Sheets-Sheet 1
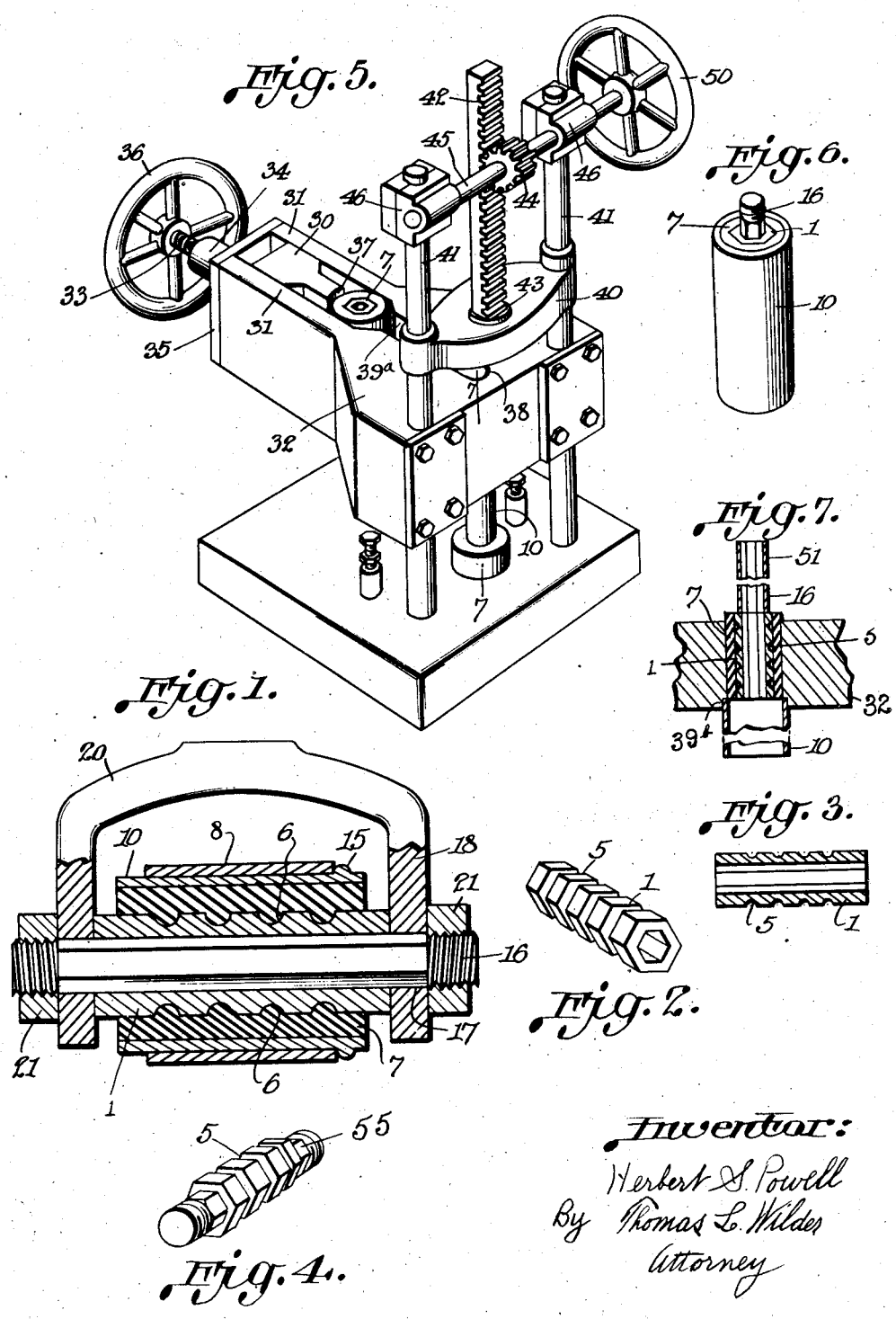

Aug. 12, 1930.                H. S. POWELL                  1,772,730
             CUSHION JOINT FOR THE SPRINGS OF AUTOMOBILES
                    Filed Aug. 3, 1927        2 Sheets-Sheet 2

Inventor
Herbert S. Powell
By Thomas L. Wilder
              Attorney

Patented Aug. 12, 1930

1,772,730

UNITED STATES PATENT OFFICE

HERBERT S. POWELL, OF UTICA, NEW YORK

CUSHION JOINT FOR THE SPRINGS OF AUTOMOBILES

Application filed August 3, 1927. Serial No. 210,410.

My invention relates to a cushion joint for the springs of automobiles and I declare the following to be a full, clear, concise and exact description thereof sufficient to enable anyone skilled in the art to which it appertains to make and use the same, reference being had to accompanying drawings in which like reference characters refer to like parts throughout the specifications.

The object of the invention is to provide a machine for forming a cushion joint made of rubber fabric or other yielding material. Such a joint is used to unite the ends of the frame that support the chassis of an automobile, to the spring ends. By employing such a cushion joint no lubricant is necessary to prevent squeaking, also the possibility of breaking the spring because of lack of lubrication, is eliminated and furthermore, such a joint always insures easy riding qualities of the automobile.

The object will appear by reference to the drawings in which:

Fig. 1 is a central vertical section of the joint shown assembled to the shackle of an automobile.

Fig. 2 is a detail perspective view of the tube employed.

Fig. 3 is a detail view showing a central longitudinal section of the tube in Fig. 2.

Fig. 4 is a detail view showing a modified form of a part employed.

Fig. 5 is a perspective view of a machine for forming the rubber joints.

Fig. 6 is a detail view showing a perspective of a rubber joint.

Fig. 7 is a detail view showing a central section of certain parts, other parts being broken away, taken on the line 7—7 of Figure 5.

Figure 8:
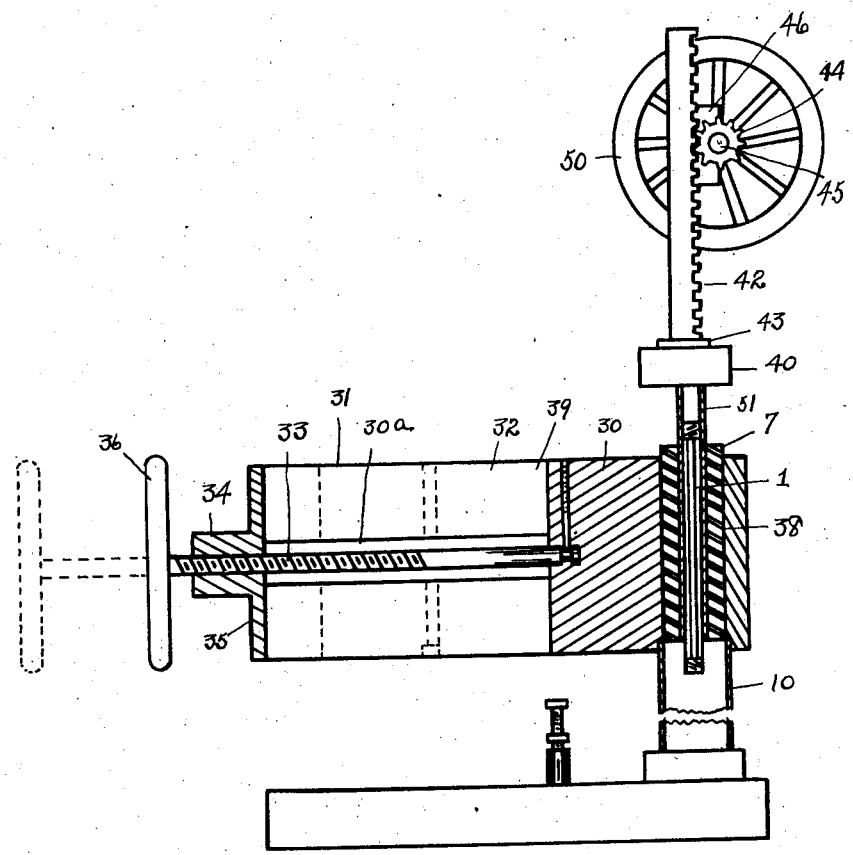
Fig. 8 is a central longitudinal sectional elevation of the machine.
Figure 9:
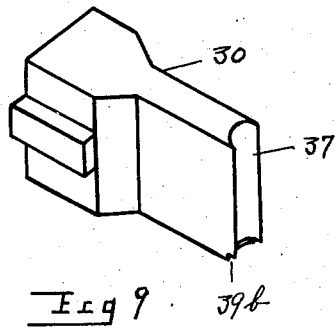
Fig. 9 is a perspective view of member employed.

Referring more particularly to the drawings, the invention embodies a hollow tube 1 having its exterior as well as its interior formed into a polygonal sided member, here shown as a hexagon. Peripheral grooves 5 are made in the exterior. Although four such grooves 5 are shown any number could be used to suit the requirements of the particular joint. Grooves 5 are adapted to receive portions 6 of the rubber bushing 7 when compressed about tube 1, whereby to prevent said rubber bushing 7 from moving longitudinally with reference to tube 1. This is desirable in order to prevent lateral swaying of leaf spring 8. Rubber bushing 7 is compressed, by means hereinafter described, into a metallic cylinder 10, whereby it can be assembled in a cartridge like manner to the end of the leaf spring 8.

In order to thus assemble the joint to the end of the spring 8, the cylinder 10 containing rubber bushing 7 compressed about tube 1 is projected through the loop at the end of spring 8. An annular shoulder 15 formed on the exterior of cylinder 10 will aid in holding cylinder 10 from moving longitudinally with reference to spring 8. A shackle bolt 16 having a hexagonal or polygonal exterior corresponding to the hexagonal or polygonal interior of tube 1 is projected through said interior of tube 1. Inasmuch as said bolt 16 and tube 1 are equipped with said hexagonal faces, there will be no rotary movement of said parts relative to each other. Furthermore, said hexagonal bolt 16 has bearings in the hexagonal holes 17, 17 formed in the depending members 18, 18 of the shackle yoke 20, whereby to prevent said bolt from revolving in its bearings with respect to yoke 20. Nuts 21, 21 are screw mounted to the threaded ends of shackle bolt 16, whereby to hold the parts in assembled position.

The means for compressing rubber bushing 7 tightly against tube 1 in such manner that portions 6 of rubber bushing 7 enter grooves 5 of tube 1 embodies a sliding member 30 actuated in guide grooves 30ª, 30ª in sides 31, 31 of form 32 by worm 33. Worm 33 engages like threads in boss 34 formed integral with end plate 35 which is bolted to sides 31, 31. A hand wheel 36 is attached to the end of worm 33 whereby to turn it, and thereby, actuate member 30. The opposite end of worm 33 is swiveled to sliding member 30. The forward part of member 30 has a round or concaved surface at 37 which cooperates with the round surface 38 at the end of recess 39, whereby to compress rubber bushing 7 therebetween and against the outer surface of tube 1. Furthermore, recess 39 is reduced at 39ᵃ to aid in compressing rubber bushing 7.

The means for inserting rubber bushing 7 with tube 1 therethrough into cylinder 10 embodies a vertically movable pressing member 40, which slides on vertical shafts 41, 41. Pressing member 40 is actuated by means of a rack 42 rigidly attached thereto at 43. Said rack 43 is engaged by spur pinion 44 mounted to turn with shaft 45 having bearings in journals 46, 46, clamped or bolted to the upper ends of shafts 41, 41. Hand wheel 50 is fixed to turn shaft 45.

A cylinder 10 is disposed in upright position beneath form 32 and just below the end 38 of recess 39ᵃ where rubber bushing 7 is compressed. Rubber bushing 7 with tube 1 therethrough is disposed in recess 39 in front of member 30 as shown in Figure 5 and will be pushed longitudinally into the reduced part 39ᵃ of recess 39 and up against the end 38 thereof by movable member 30. The end of recess 39 and the concaved surface 37 of member 30 are enlarged slightly 39ᵇ at the lower part thereof to allow for the thickness of cylinder 10, whereby the interior of said cylinder 10 will align with the interior surface of form 32 at recess 39 and concaved surface 37 of member 30. This alignment will allow rubber bushing 7 to be pushed down into cylinder 10 by member 40. A lubricant can be brushed over the contacting surface relative to the pressing of bushing 7 into cylinder 10. An extra cylindrical shaft 51 is placed in upright position between the adjacent upright end of tube 1 and under surface of movable member 40. Wheel 50 is turned then to force said member 40 down which will in turn force rubber bushing 7 into cylinder 10.

Figure 4 shows a modification embodying a member 55 that corresponds to bolt 16 and sleeve 1 of the former construction, here made as one piece.

Having thus described my invention what I claim as new and desire to obtain by Letters Patent is as follows:

1. In a machine for forming a cushion joint for the springs of automobiles, means for compressing a rubber cylinder and other means cooperating with said first named means for forcing said cylinder into a casing.

2. In a machine for forming a cushion joint for the springs of automobiles, a frame having a recess, a movable member for compressing a rubber cylinder into said recess and another movable member cooperating with said first named movable member for forcing said rubber cylinder into a casing.

3. In a machine for forming a cushion joint for the springs of automobiles, a movable member having a concave surface, means for actuating said member, whereby to compress a yielding member, another movable member cooperating with said first named member for forcing said yielding member into a casing, a rack attached to said second named movable member and a gear meshing with said rack, whereby to actuate said last named movable member.

4. In a machine for forming a cushion joint for the springs of automobiles, a frame having a recess with a reduced part, a member movable in said recess, means for actuating said member, whereby to compress a rubber cylinder into the reduced part of said recess, a vertically movable member mounted on said frame for forcing said compressed rubber cylinder into a casing, a rack attached to said vertically movable member, a gear meshing with said rack and means for turning said gear, whereby to actuate said vertically movable member.

5. In a machine for forming a cushion joint for the springs of automobiles, a frame having a recess with a reduced portion, a member movable in said recess, means for actuating said member, whereby to compress a member in said reduced portion of the recess, a vertically movable member, mounted on said frame, a rack attached to said vertically movable member, a gear meshing with said rack, and a wheel for turning said gear, whereby to actuate said vertically movable member to force said rubber member into a casing.

In testimony whereof I have affixed my signature.

HERBERT S. POWELL.